May 6, 1952     F. J. NEUBAUER ET AL     2,595,980
SIGNALING APPARATUS
Filed March 16, 1950
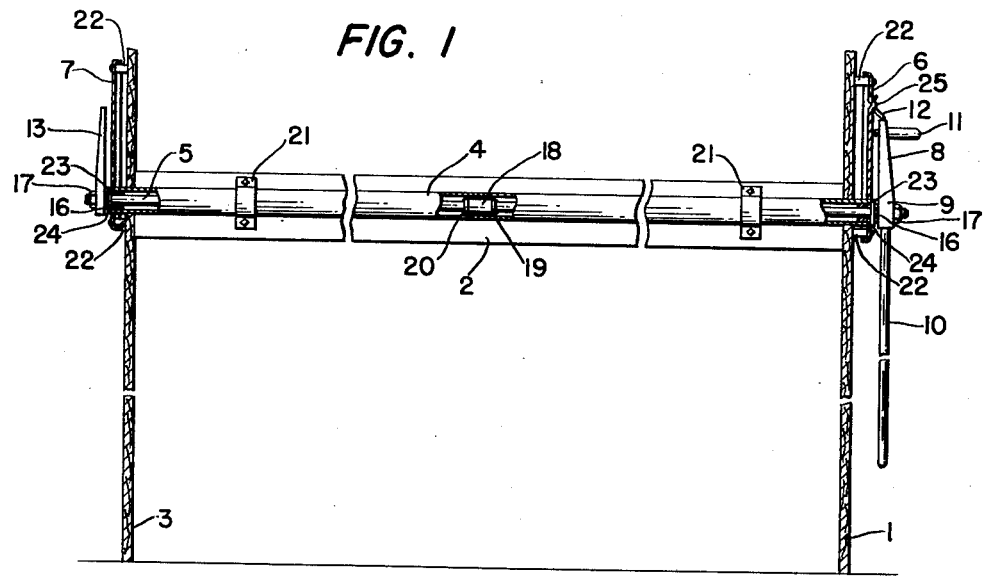
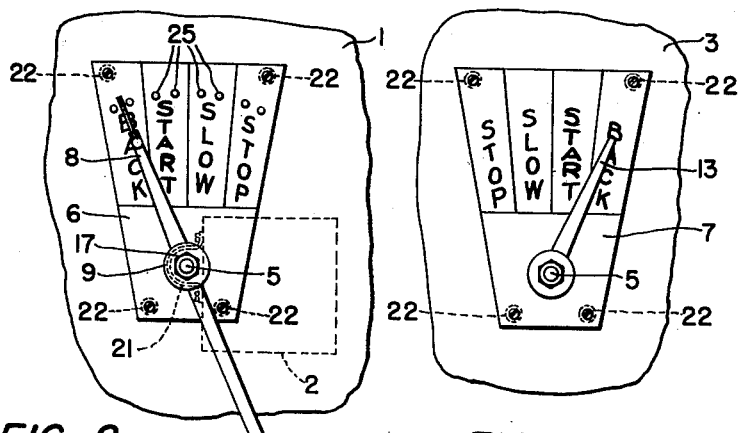
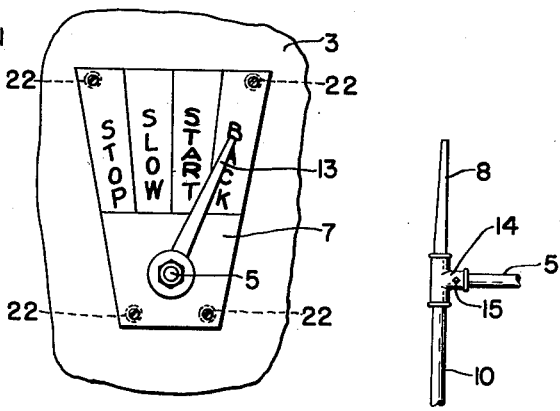
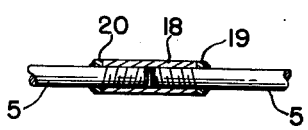
Ferdinand J. Neubauer, Oakley W. Neubauer, INVENTORS.
BY Bush & Bush, ATTORNEYS.

Patented May 6, 1952

2,595,980

UNITED STATES PATENT OFFICE 2,595,980

SIGNALING APPARATUS

Ferdinand J. Neubauer, Muscatine, and Oakley W. Neubauer, Walcott, Iowa

Application March 16, 1950, Serial No. 150,019

5 Claims. (Cl. 116—133)

Our invention relates to an improvement in signalling apparatus for use in connection with tractor-drawn hayforks for mowing away hay.

The objects of our invention are to provide an indicator whereby the man who operates a power-impelled hayfork for mowing away hay in a barn may conveniently signal to the driver of a tractor used to pull the hoisting line or cable that lifts the fork and its load of hay from a wagon and draws it into the haymow, whereby the fork operator may indicate to the tractor driver when the fork has been engaged with the hay and is ready to be drawn up, when it has been drawn far enough and when it should be stopped and returned for a new bunch of hay; to enable a farmer to avoid the need of a third man to watch the operation and signal the tractor driver; to provide such an appliance with dials at both ends of a barn in combination with a pointer to indicate a plurality of signals as to operations required on the part of the tractor driver; to provide such an apparatus in which the pointer will be automatically held in a fixed position until manually released therefrom; to provide such an apparatus which can be supported and located where it will be free from accidental interference or displacement and where the operating handle and the pointers can readily be disassembled.

We accomplish these objects by the means illustrated in the accompanying drawings, in which, Figure 1 is a side elevation of our apparatus attached to opposite ends of a barn but with portions broken away;

Figure 2 is a front elevation of the load dial;

Figure 3 is a front elevation of the tractor dial;

Figure 4 is a detail showing an alternate method of attaching the handle of the load dial to the operating rod;

Figure 5 is a detail of a sleeve and lock washers for joining two sections of operating rod.

Similar numerals refer to similar parts throughout the several views.

Our apparatus comprises a dial 6 to be mounted upon the end of a barn in which is located the upper door through which hay is carried into the haymow in common practice. This dial may be of any desired shape, but the keystone shape shown in Figure 2 is a convenient form. It may be mounted upon blocks 22 secured to the siding of a barn by bolts, screws or other suitable means or where there are no weather strips, the blocks may be omitted and the dial may be secured to the siding. It is preferably placed at a height corresponding to about the height of a load of hay as carried by an ordinary hayrack so that the driver may conveniently reach it without descending from his load.

At the opposite end of the barn a similar dial 7 is similarly mounted at a corresponding height. A pipe 4 is mounted upon the inside structure of the barn and extends from one dial to the other. The pipe 4 may be supported by brackets 21 or any other suitable means or if desired, the pipe may be omitted and the rod 5 carried on suitable supports mounted upon the framing of the barn. We prefer to use the form with the rod 5 installed in and passing through the pipe 4 as it avoids all danger from animals, farm implements, hay or other things coming into contact with the rod 5 which might clog it or interfere with its operation.

When the pipe 4 is used, bushings 23 are mounted in the ends thereof which support the ends of the rod 5 and through which the rod 5 projects.

For convenience, we refer to the end of the barn having the intake for the hay as the front end and the opposite end as the rear end.

At the front end of the rod 5 a pointer 8 is attached and may be formed separately from the T-shaped head 14 as shown in Figure 4 or may be formed integral with the handle 10 as shown in Figure 1, with a suitable head formed thereon through which the end of the rod 5 projects. The end of the rod 5 is threaded and lock washers 16 and 17 may be threaded thereon to secure the pointer 8 and handle 10 rigidly to the rod, or the head 14 may be united to the rod 5 by a set screw 15 or other suitable means.

The dial 6 is preferably formed of sheet aluminum or may be of wood, plastic or any other water-resistant material. When made of sheet metal, little knobs or projections 25 which project outwardly, are formed in the dial 6 or if made of wood, buttons or round-headed tacks or screws may be secured to the dial. At the upper end of the pointer 8 we mount a finger 12 of resilient material which may be either a flat or round metal spring and as the pointer is turned from one space to another, this finger will contact the knobs or buttons and they will form stops to detain the pointer in any given position to which it may be moved manually.

A handle 10 is united to the head of the pointer 8 and extends downwardly far enough so that it can be reached by a person standing on the ground or standing on the front of the hayrack when the hay has been removed therefrom.

A short transverse handle 11 is mounted upon the upper end of the pointer 8 and may be fastened to the pointer by bolts or other suitable means.

The pointer may be manually moved to the desired adjusted position on the dial either by the handle 11 or by the handle 10.

Upon the rear end of the barn a similar dial 7 is mounted and a pointer 13 is secured upon the rear end of the rod 4 by the means described or any other suitable means. It will be noticed that with our construction the rod 5 can be turned from either end of the barn, that is, the man handling the hayload can operate the rod by either handle 10 or 11 and the man at the rear of the barn operating the tractor can likewise turn the rod by moving the pointer 13 to either side. Thus, when he has moved the tractor back of the barn in response to the "Back" signal, he can move the pointer to the word "Stop" and the man at the front of the barn will understand that the tractor is then back in position to start up with another fork full of hay on signal from the load man.

The dials have separate divisions thereof with words constituting directions to the driver of the tractor, such as "Back," "Start," "Slow" and "Stop." Similar words are placed upon the front dial and the letters are large enough so that they be easily read at the farthest distance to which the tractor moves in operating the hayfork. The words may be varied or other signs substituted therefor as desired.

It will be understood that in the ordinary operations of mowing hay with a power fork, the fork is attached to the front end of a cable or line which runs over a pulley mounted upon a carriage which carriage in turn is mounted upon a track secured in the top of the haymow and extending longitudinally thereof. This track is preferably inclined upwardly to the rear so that the weight of the fork will cause it to travel downwardly and reset it at the front end of the track when released. The cable which operates this carriage extends over a pulley at the rear end of the track, thence down to a pulley journaled upon a suitable support at the rear end of the barn. The rear end of the cable is hitched to a tractor.

In the operation of mowing away hay, the load of hay is driven to a point on the ground below the hay door and the front end of the carriage track. The fork is then allowed to descend and the driver or operator sinks the tines of the fork into the desired portion of the load of hay and adjusts it to lift a portion thereof.

The tractor is then driven to the rear from the barn pulling up the fork and its load and when the fork reaches the front end of the track, the carriage travels inwardly upon the track to the desired point where it is released by the driver of the hayrack by a trip rope suitably arranged for that purpose.

The hay forks, cables and tractors are in common use for the purposes stated, and form no part of the present invention, and we make no claim to either of them.

In the operation of such apparatus, it has been customary to station a third man off to one side where he can see and receive signals from the man operating the hayfork and where he can signal to the driver of the tractor when the fork or rod is to be raised. Our apparatus does away with the necessity of employing such third man, and thus saves much expense.

In the operation of our apparatus, the fork man inserts the fork in the load of hay as desired and then manually moves the pointer until the pointer reaches the word "Start." The tractor driver then starts his tractor to pull up the hay and as he proceeds, the fork man moves the pointer to the words "Slow" and "Stop" at the time desired. The fork man then pulls the trip rope which releases the hay from the fork and after that is done, he turns the pointer back to the word "Back" and the tractor driver drives his tractor back to the barn allowing the fork to descend and the operation to be repeated.

Various modifications may be made in the form, material and arrangement of the parts and we do not limit our claims to the precise forms shown in the drawings.

We claim:

1. A signalling implement for use in connection with power-actuated hay forks for transferring hay from a load to the mow of a hay barn, including a dial plate attachable to one end of a hay barn, a corresponding dial plate attachable to the opposite end of the barn, both dial plates having a similar series of directive words or signs thereon, a connecting rod having its opposite ends journaled in the dial plates respectively and projecting a short distance beyond the plates, corresponding pointers usable as levers rigidly united to the opposite ends of the rod close to the faces of the dials respectively whereby the rod may be rotated by manual movement of either of said lever pointers and both of said pointers thereby moved simultaneously to any of the corresponding signs or words upon their respective dials.

2. An implement as described in claim 1, said pointer having a downwardly projecting handle united thereto at the front end of the barn arranged at a convenient height for manual operation by the driver of a load of hay either without dismounting from his load or from the ground.

3. In an implement as described in claim 1, the connecting rod formed in a plurality of sections each section being united to the next succeeding section by a threaded sleeve having oppositely inclined internal threads in mesh with corresponding external threads upon the adjacent ends of the sections.

4. In an implement as described in claim 1, the connecting rod including a plurality of sections each section being united to the next succeeding section by a threaded sleeve having oppositely inclined internal threads in mesh with corresponding external threads upon the adjacent ends of the section, and lock washers threaded upon the threaded ends of the sections arranged to bear against and lock the sleeves in adjusted positions.

5. An implement as described in claim 1, said dial plates being formed of sheet metal and having a series of directive words stamped thereon in raised letters whereby the operator of a hay fork at one end of the barn may communicate orders to the driver of a tractor at the opposite end of the barn to direct the movements of the tractor whereby the movement of the hay fork may be controlled.

FERDINAND J. NEUBAUER.
OAKLEY W. NEUBAUER.

REFERENCES CITED

The following references are of record in the file of this patent:

UNITED STATES PATENTS

| Number | Name | Date |
|---|---|---|
| 451,754 | Chadburn | May 5, 1891 |
| 768,689 | Poli | Aug. 30, 1904 |
| 974,806 | McQuinn | Nov. 8, 1910 |
| 995,746 | Webster | June 20, 1911 |
| 1,302,756 | Baker | May 6, 1919 |
| 1,425,905 | Shartle | Aug. 15, 1922 |

FOREIGN PATENTS

| Number | Country | Date |
|---|---|---|
| 172,085 | Great Britain | Nov. 24, 1921 |